United States Patent
Ma et al.

(10) Patent No.: US 9,375,897 B2
(45) Date of Patent: Jun. 28, 2016

(54) DISPLAY DEVICE AND METHOD FOR PRODUCING THE SAME

(71) Applicant: EverDisplay Optronics (Shanghai) Limited, Shanghai (CN)

(72) Inventors: Kunliang Ma, Shanghai (CN); Chih-Wei Wen, Shanghai (CN)

(73) Assignee: EverDisplay Optronics (Shanghai) Ltd., Shanghai (CN)

( * ) Notice: Subject to any disclaimer, the term of this patent is extended or adjusted under 35 U.S.C. 154(b) by 0 days.

(21) Appl. No.: 14/603,086

(22) Filed: Jan. 22, 2015

(65) Prior Publication Data

US 2016/0067946 A1    Mar. 10, 2016

(30) Foreign Application Priority Data

Sep. 4, 2014  (CN) .......................... 2014 1 0446861

(51) Int. Cl.
| | |
|---|---|
| *B32B 7/12* | (2006.01) |
| *B32B 37/12* | (2006.01) |
| *F21K 2/00* | (2006.01) |
| *B32B 37/14* | (2006.01) |
| *B32B 37/00* | (2006.01) |
| *B32B 38/00* | (2006.01) |

(52) U.S. Cl.
CPC ................ *B32B 7/12* (2013.01); *B32B 37/003* (2013.01); *B32B 37/12* (2013.01); *B32B 37/14* (2013.01); *B32B 38/145* (2013.01); *F21K 2/00* (2013.01); *B32B 2255/20* (2013.01); *B32B 2255/28* (2013.01); *B32B 2264/102* (2013.01); *B32B 2307/4023* (2013.01); *B32B 2307/412* (2013.01); *B32B 2307/422* (2013.01); *B32B 2307/75* (2013.01); *B32B 2457/20* (2013.01)

(58) Field of Classification Search
CPC .......... B32B 7/12; B32B 37/12; B32B 37/14; B32B 2255/28; B32B 2457/20; B32B 2255/20; B32B 2307/422; F21K 2/00
See application file for complete search history.

(56) References Cited

U.S. PATENT DOCUMENTS

| | | | |
|---|---|---|---|
| 2007/0275253 A1* | 11/2007 | Thiel | B32B 17/066 428/432 |
| 2009/0237586 A1* | 9/2009 | Han | G02F 1/133308 349/58 |
| 2010/0215976 A1* | 8/2010 | Suwa | B32B 27/30 428/522 |
| 2011/0033720 A1* | 2/2011 | Fujita | C09J 7/00 428/522 |
| 2014/0211447 A1* | 7/2014 | Harding | G02C 7/104 362/84 |

* cited by examiner

*Primary Examiner* — Betelhem Shewareged
(74) *Attorney, Agent, or Firm* — Wang Law Firm, Inc.

(57) ABSTRACT

A display device includes a display module, a cover, and a bonding layer between the display module and the cover. A first ink layer is disposed in at least a portion between the cover and the bonding layer. A second ink layer is disposed in at least a portion between the display module and the bonding layer. A method for producing a display device includes applying an ink on an end of a cover to form a first ink layer. A bonding layer is formed on the first ink layer and the cover. A display module is provided and coupled to the cover via the bonding layer.

11 Claims, 1 Drawing Sheet

DISPLAY DEVICE AND METHOD FOR PRODUCING THE SAME

BACKGROUND OF THE INVENTION

The present invention relates to the field of display devices and, more particularly, to a display device and a method for producing the display device.

Current display devices has several types including one glass solution (OGS) structure (an integral touch control structure), glass-film-film (GFF) structure (a film type structure with a protective glass), glass-film (GF) structure, In-cell structure (the display screen is embedded with a touch sensor function), and On-cell structure (the touch screen is inserted between the substrate of the color filter of the display screen and the polarizer). In the above structures, an ink is provided on a rear face of the touch control panel or the cover glass for providing insulation, resistance to acid, a moisture-proof effect, and protection. There are more and more types of inks, and the inks are more and more reliable.

The printing technique of inks is very mature. Generally, the ink is printed on an end of the rear face of the touch control panel or the cover glass and has a thickness of about 30 μm, causing a level difference on the rear face of the touch control panel or the cover glass. The rear face of the touch control panel or the cover glass is bonded to a lower layer structure by an optically clear adhesive. Existence of the level difference causes bubbles when a thin optically clear adhesive is used, adversely affecting the quality of the product. To reduce the bubbles, a thicker optically clear adhesive is used for bonding purposes, and the thickness of the optically clear adhesive is about 200 μm if the anti-level difference capability of the optically clear adhesive is 15%-20%. Lighting and thinning of the touch control display devices has become a trend because of increasingly high demands of electronic products. Thus, the increase in the overall thickness of the display device resulting from the thick optically clear adhesive cannot fulfill the demand of lighting and thinning.

BRIEF SUMMARY OF THE INVENTION

The present invention provides a display device and a method for producing the display device to solve the disadvantage of the increase in the overall thickness of the device resulting from using a thick optically clear adhesive due to the existence of the level difference of ink.

In an aspect, a display device includes a display module, a cover, and a bonding layer between the display module and the cover. A first ink layer is disposed in at least a portion between the cover and the bonding layer. A second ink layer is disposed in at least a portion between the display module and the bonding layer.

By disposing an ink layer on each structural layer, the single ink layer can be as thin as 5 μm, significantly reducing the level difference. Thus, the bonding layer can have a smaller thickness for bonding. In actual production, a bonding layer with a thickness of only 50 μm is sufficient to achieve the bonding purposes without generation of bubbles. The thickness of the bonding layer can effectively be reduced by providing the first ink layer and the second ink layer such that the overall thickness of the display device is reduced. Thus, the demand of lighting and thinning of electronic products is fulfilled by solving the problem of thick optically clear adhesive in the prior art.

The first ink layer can have a thickness of 5-7 μm.

The display module can include a first indium tin oxide film, a second indium tin oxide film, and a module bonding layer between the first indium tin oxide film and the second indium tin oxide film. A third ink layer can be disposed in at least a portion between the first indium tin oxide film and the module bonding layer. The third ink layer has a thickness of 5-7 μm.

A fourth ink layer can be disposed in at least a portion between the second indium tin oxide film and the module bonding layer. The fourth ink layer has a thickness of 5-7 μm.

The second ink layer can have a thickness of 5-7 μm.

The bonding layer can have a thickness smaller than or equal to 50 μm.

The first ink layer can be disposed on an end of the cover.

In a second aspect, a method for producing a display device includes:

applying an ink on an end of a cover to form a first ink layer;

forming a bonding layer on the first ink layer and the cover; and providing a display module, with the display module coupled to the cover via the bonding layer.

In a first example, providing the display module includes providing a first indium tin oxide film and applying an ink on an end of an upper face of the first indium tin oxide film to form a second ink layer.

In a second example, providing the display module includes:

providing a first indium tin oxide film, and applying an ink on an end of an upper face of the first indium tin oxide film to form a third ink layer;

forming a module bonding layer on the upper face of the first indium tin oxide film and the third ink layer;

providing a second indium tin oxide film, applying an ink on an end of an upper face of the second indium tin oxide film to form a second ink layer, and applying an ink on an end of a lower face of the second indium tin oxide film to form a fourth ink layer; and coupling the lower face of the second indium tin oxide film to the upper face of the first indium tin oxide film by the module bonding layer.

The first ink layer can have a thickness of 5-7 μm.

The second ink layer can have a thickness of 5-7 μm.

The bonding layer can have a thickness smaller than or equal to 50 μm.

The present invention will become clearer in light of the following detailed description of illustrative embodiments of this invention described in connection with the drawings.

DETAILED DESCRIPTION OF THE INVENTION

Figure 1:
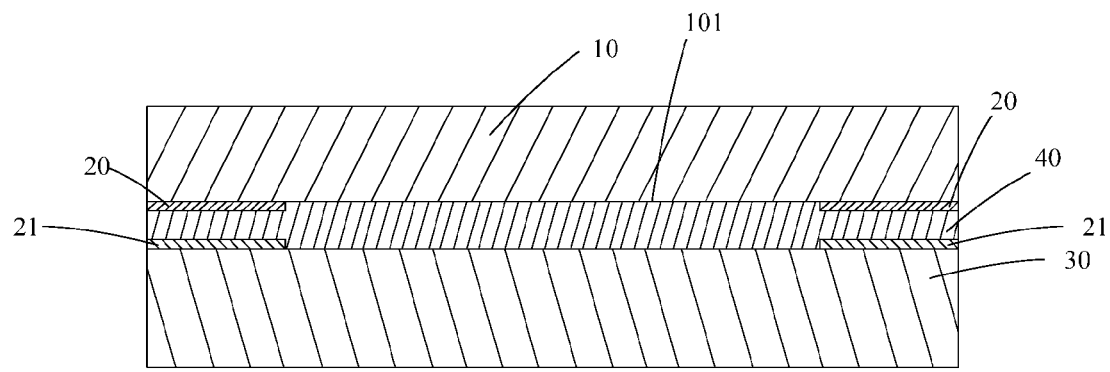
FIG. 1 is a diagrammatic cross sectional view of a display device according to the present invention.

FIG. 1 is a diagrammatic cross sectional view of a display device according to the present invention. According to the display device and a method for producing the display device, given the thickness of the ink is not changed, the ink layers are disposed on faces of the structural layers of the display device such that the thickness of a single ink layer can be as thin as 5 μm at best, effectively reducing the level differences of the ink layer. No bubbles are generated when using an optically clear adhesive for bonding purposes, nor a thick optically clear adhesive is required. In practice, an optically clear adhesive layer with a thickness of only 50 μm is sufficient to perform bonding between structural layers, which is significantly thinner than current optically clear adhesives of 200 μm. Thus, the overall thickness of the display device is reduced accordingly. The display device according to the present invention can be an OGS structure, a GFF structure, a GF structure, an In-cell structure, or an On-cell structure. The display device and the method for producing the display device according to the present invention will now be set forth in connection with the accompanying drawings.

With reference to FIG. 1, the display device according to the present invention includes a display module 30, a cover 10, and a bonding layer 40 between the display module 30 and the cover 10. A first ink layer 20 is disposed in at least a portion between the cover 10 and the bonding layer 40. Preferably, the first ink layer 20 is disposed on an end of a rear face 101 of the cover 10 and extends along a perimeter of the rear face 101 of the cover 10, forming a recessed space in a middle of the rear face 101 of the cover 10. The height of the recessed space is the thickness of the first ink layer 20 (i.e., the ink level difference). The first ink layer 20 has a thickness of 5-7 μm, most preferably 5 μm. A second ink layer 21 is disposed in at least a portion between the display module 30 and the bonding layer 40.

A single ink layer can be as thin as 5 μm by printing an ink on each structural layer. Namely, the thickness of the first ink layer 20 is only 5-7 μm, which significantly reduces the ink level difference as compared to the ink layer of 30 μm of the prior art. Thus, when using an optically clear adhesive to proceed with bonding, the thickness of the optically clear adhesive is reduced accordingly. In practice, an optically clear adhesive with a thickness of only 50 μm is sufficient to avoid generation of bubbles during bonding, assuring the quality of the display device. In comparison with current optically clear adhesives of 200 μm, the thickness of the optically clear adhesive is significantly reduced such that the overall thickness of the display device is also reduced.

Figure 2:
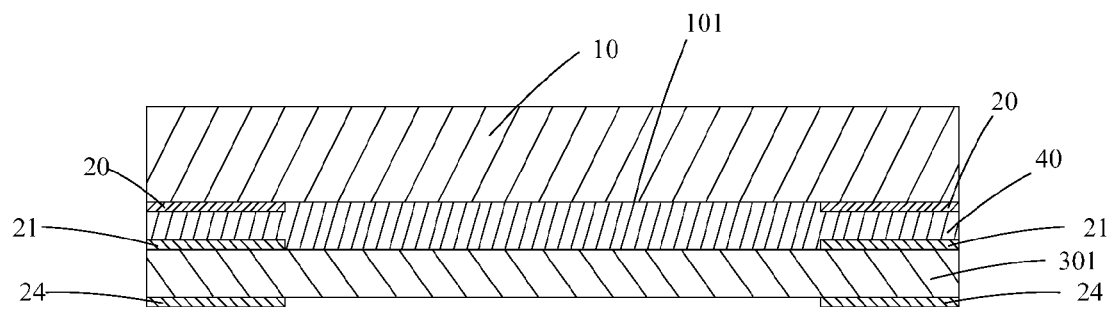
FIG. 2 is a diagrammatic cross sectional view of a first example of the display device according to the present invention.

FIG. 2 is a diagrammatic cross sectional view of a first example of the display device according to the present invention. The display device shown in FIG. 2 is a GF structure and includes a cover 10, a first ink layer 20, a bonding layer 40, and a first indium tin oxide film 301. The bonding layer 40 is disposed between the first indium tin oxide film 301 and the cover 10 to bond an upper face of the first indium tin oxide film 301 with the rear face 101 of the cover 10.

The first ink layer 20 is disposed in at least a portion between the cover 10 and the bonding layer 40. Preferably, the first ink layer 20 is disposed on an end of the rear face 101 of the cover 10 and extends along a perimeter of the rear face 101 of the cover 10, forming a recessed space in a middle of the rear face 101 of the cover 10. The height of the recessed space is the thickness of the first ink layer 20 (i.e., the ink level difference). The first ink layer 20 has a thickness of 5-7 μm, most preferably 5 μm.

A second ink layer 21 is disposed in at least a portion between the first indium tin oxide film 301 and the bonding layer 40. Preferably, the second ink layer 21 is disposed on an end of an upper face of the first indium tin oxide film 301 and forms a recessed space on the upper face of the first indium tin oxide film 301. The height of the recessed space on the upper face of the first indium tin oxide film 301 is the thickness of the second ink layer 21 (i.e., the ink level difference). The second ink layer 21 has a thickness of 5-7 μm, most preferably 5 μm.

The bonding layer 40 bonds the rear face 101 of the cover 10 with the upper face of the first indium tin oxide film 301. The bonding layer 40 fills the recessed space on the rear face 101 of the cover 10 and the recessed space on the upper face of the first indium tin oxide film 301. Since the height of each recessed space is equal to the thickness of the first ink layer 20 or the second ink layer 21 (only 5-7 μm), the thickness of the bonding layer 40 can be as thin as possible. To achieve perfect bonding between the cover 10 and the first indium tin oxide film 301, the thickness of the bonding layer 40 is smaller than or equal to 50 μm. Using a bonding layer 40 having a thickness of 50 μm can achieve bubble-free bonding. The bonding layer 40 uses an optically clear adhesive. In comparison with current optically clear adhesives of 200 μm, the overall thickness of the display device is significantly reduced.

In this example, the cover 10 is a touch control cover or a touch control glass. Furthermore, a fifth ink layer 24 is disposed on a lower face of the first indium tin oxide film 301. The fifth ink layer 24 is preferably disposed on an end of the lower face of the first indium tin oxide film 301 and extends along a perimeter of the lower face of the first indium tin oxide film 301 to form a recessed space on the lower face of the first indium tin oxide film 301. The height of the recessed space on the lower face of the first indium tin oxide film 301 is 5-7 μm, most preferably 5 μm.

Figure 3:
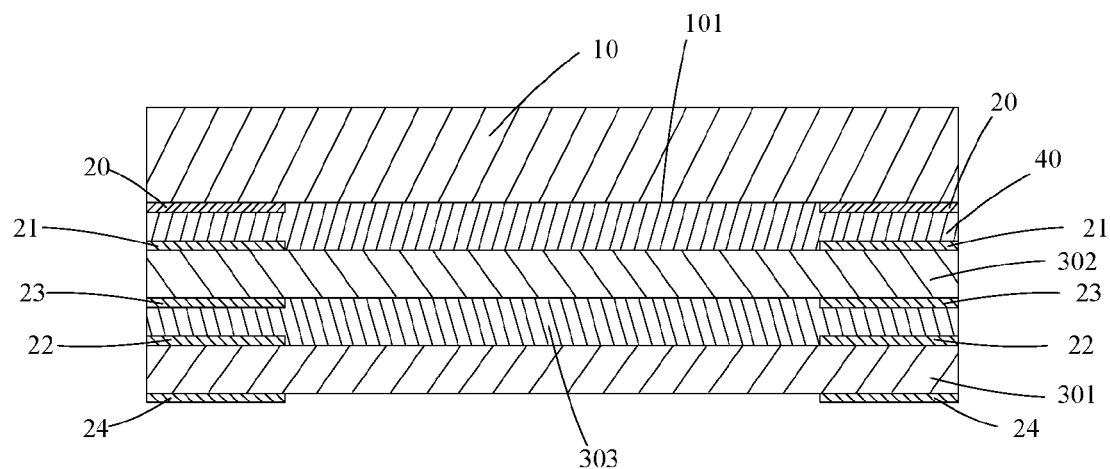
FIG. 3 is a diagrammatic cross sectional view of a second example of the display device according to the present invention.

FIG. 3 is a diagrammatic cross sectional view of a second example of the display device according to the present invention. The display device shown in FIG. 3 is a GFF structure and includes a cover 10, a first ink layer 20, a bonding layer 40, a first indium tin oxide film 301, a second indium tin oxide film 302, a module bonding layer 303, a second ink layer 21, a third ink layer 22, and a fourth ink layer 23.

The bonding layer 40 is disposed between the cover 10 and the second indium tin oxide film 302. The module bonding layer 303 is disposed between the first indium tin oxide film 301 and the second indium tin oxide film 302. The first ink layer 20 is disposed in at least a portion between the cover 10 and the bonding layer 40. Preferably, the first ink layer 20 is disposed on an end of the rear face 101 of the cover 10 and extends along a perimeter of the rear face 101 of the cover 10, forming a recessed space in a middle of the rear face 101 of the cover 10. The height of the recessed space is the thickness of the first ink layer 20 (i.e., the ink level difference). The first ink layer 20 has a thickness of 5-7 μm, most preferably 5 μm.

The second ink layer 21 is disposed in at least a portion between the second indium tin oxide film 302 and the bonding layer 40. Preferably, the second ink layer 21 is disposed on an end of an upper face of the second indium tin oxide film 302 and extends along a perimeter of the upper face of the second indium tin oxide film 302, forming a recessed space in a middle of the upper face of the second indium tin oxide film 302. The height of the recessed space on the upper face of the second indium tin oxide film 302 is the thickness of the second ink layer 21 (i.e., the ink level difference). The second ink layer 21 has a thickness of 5-7 μm, most preferably 5 μm.

The third ink layer 22 is disposed in at least a portion between the first indium tin oxide film 301 and the module bonding layer 303. Preferably, the third ink layer 22 is disposed on an end of an upper face of the first indium tin oxide film 301 and extends annularly to form a recessed space on the upper face of the first indium tin oxide film 301. The height of the recessed space on the upper face of the first indium tin oxide film 301 is the thickness of the third ink layer 22 (i.e., the ink level difference). The third ink layer 22 has a thickness of 5-7 μm, most preferably 5 μm.

The fourth ink layer 23 is disposed in at least a portion between the second indium tin oxide film 302 and the module bonding layer 303. Preferably, the fourth ink layer 23 is disposed on an end of a lower face of the second indium tin oxide film 302 and extends annularly to form a recessed space on the lower face of the second indium tin oxide film 302. The height of the recessed space on the upper face of the second indium tin oxide film 302 is the thickness of the fourth ink layer 23 (i.e., the ink level difference). The fourth ink layer 23 has a thickness of 5-7 μm, most preferably 5 μm.

Furthermore, a fifth ink layer 24 is disposed on a lower face of the first indium tin oxide film 301. Preferably, the fourth ink layer 24 is disposed on an end of the lower face of the first indium tin oxide film 301 and extends annularly to form a recessed space on the lower face of the first indium tin oxide film 301. The height of the recessed space on the upper face of the second indium tin oxide film 302 is the thickness of the second ink layer 21. The fourth ink layer 24 has a thickness of 5-7 μm, most preferably 5 μm.

The upper face of the second indium tin oxide film 302 is bonded to the rear face 101 of the cover 10 by the bonding layer 40. The bonding layer 40 fills the recessed space on the rear face 101 of the cover 10 and the recessed space on the upper face of the second indium tin oxide film 302. The lower face of the second indium tin oxide film 302 is bonded to the upper face of the first indium tin oxide film 301 by the module bonding layer 303. The module bonding layer 303 fills the recessed space on the lower face of the second indium tin oxide film 302 and the recessed space on the upper face of the first indium tin oxide film 301. The thicknesses of the bonding layer 40 and the module bonding layer 303 are smaller than or equal to 50 μm. In comparison with current ink layers having a thickness of 30 μm, the thickness of each of the first ink layer 20, the second ink layer 21, the third ink layer 22, and the fourth ink layer 23 is 5 μm, which significantly reduces the ink level difference. Thus, the thicknesses of the bonding layer 40 and the module bonding layer 303 are reduced accordingly. Given the thicknesses of the bonding layer 40 and the module bonding layer 303 are 50 μm, no bubbles are generated during bonding, assuring the quality of the display device. In comparison with current optically clear adhesives of 200 μm, the thickness of the optically clear adhesive is greatly reduced such that the overall thickness of the display device is also reduced. The bonding layer 40 and the module bonding layer 303 are optically clear adhesive layers. In current structures, the thickness of the optically clear adhesive between two structural layers free of ink layers is 50 μm, which is the same as the thickness of the module bonding layer 303 of this example. Since the thickness of the bonding layer 40 is thinner than that of the current structure, the overall thickness of the display device according to the present invention is reduced. In this example, the cover 10 is a touch control cover or a touch control glass.

The advantageous effects of the display device according to the present invention are that by disposing an ink layer on each structural layer, the single ink layer can be as thin as 5 μm, significantly reducing the level difference created by the ink layer and hence reducing the possibility of generation of bubbles during bonding. Thus, the bonding layer 40 can have a smaller thickness. In actual production, a bonding layer 40 with a thickness of only 50 μm is sufficient to achieve the bonding purposes without generation of bubbles. The thickness of the bonding layer 40 can effectively be reduced by providing the first ink layer 20 and the second ink layer 21 such that the overall thickness of the display device is reduced. Thus, the demand of lighting and thinning of electronic products is fulfilled by solving the problem of thick optically clear adhesive in the prior art.

A method for producing the display device according to the present invention will now be set forth. With reference to FIG. 1, the method for producing the display device includes applying an ink on an end of a rear face 101 of a cover 10, forming a first ink layer 20 having a thickness of 5-7 μm. The first ink layer 20 extends annularly to form a recessed space on the rear face 101 of the cover 10. The height of the recessed space is the thickness of the first ink layer 20 (i.e., the ink level difference). The thickness of the first ink layer 20 is preferably 5 μm. The first ink layer 20 can be formed by printing, such as direct printing, heat transfer printing, hot embossing, or inkjet printing.

A bonding layer 40 is then formed on the first ink layer 20 and the cover 10. Next, a display module 30 is provided and is coupled to the cover 10 via the bonding layer 40.

With reference to FIG. 2, in a first example of the method for producing the display device according to the present invention, providing the display module 30 includes providing a first indium tin oxide film 301 and applying an ink on an end of an upper face of the first indium tin oxide film 301 to form a second ink layer 21. The second ink layer 21 has a thickness of 5-7 μm. The second ink layer 21 extends annularly to form a recessed space on the upper face of the first indium tin oxide film 301. The height of the recessed space on the upper face of the first indium tin oxide film 301 is the thickness of the second ink layer 21 (i.e., the ink level difference). The thickness of the second ink layer 21 is preferably 5 μm to make the display device thinner. The second ink layer 21 can be formed by printing, such as direct printing, heat transfer printing, hot embossing, or inkjet printing.

The bonding layer 40 bonds the first indium tin oxide film 301 with the cover 10. The bonding layer 40 fills the recessed space on the rear face 101 of the cover 10 and the recessed space on the upper face of the first indium tin oxide film 301. Since the height of each recessed space is smaller (i.e., the ink level difference is smaller), the thickness of the bonding layer 40 can be reduced accordingly. The thickness of the bonding layer 40 is smaller than or equal to 50 μm. Using a bonding layer 40 having a thickness of 50 μm can achieve bubble-free bonding between the first indium tin oxide film 301 and the cover 10. In comparison with current optically clear adhesives of 200 μm, the overall thickness of the display device is significantly reduced. The bonding layer 40 uses an optically clear adhesive. In this example, the cover 10 is a touch control cover or a touch control glass. Furthermore, a fifth ink layer 24 is disposed on a lower face of the first indium tin oxide film 301 and has a thickness of 5-7 μm. The fifth ink layer 24 is disposed on an end of the lower face of the first indium tin oxide film 301.

With reference to FIG. 3, in a second example of the method for producing the display device according to the present invention, providing the display module 30 includes providing a first indium tin oxide film 301, and applying an ink on an end of an upper face of the first indium tin oxide film 301 to form a third ink layer 22. The third ink layer 22 has a thickness of 5-7 μm. The third ink layer 22 extends annularly to forming a recessed space on the upper face of the first indium tin oxide film 301. The height of the recessed space on the upper face of the first indium tin oxide film 301 is the thickness of the third ink layer 22 (i.e., the ink level difference). The thickness of the third ink layer 22 is preferably 5 μm to make the display device thinner. The third ink layer 22 can be formed by printing, such as direct printing, heat transfer printing, hot embossing, or inkjet printing.

The second example of the method further includes forming a module bonding layer 303 on the upper face of the first indium tin oxide film 301 and the third ink layer 22.

The second example of the method further includes providing a second indium tin oxide film 302, and applying an ink on an upper face of the second indium tin oxide film 302 to form a second ink layer 21. The second ink layer 21 has a thickness of 5-7 μm. The second ink layer 21 extends annularly to form a recessed space on the upper face of the first indium tin oxide film 301. The height of the recessed space on the upper face of the first indium tin oxide film 301 is the thickness of the second ink layer 21. The thickness of the second ink layer 21 is preferably 5 μm to make the display device thinner. The second ink layer 21 can be formed by printing, such as direct printing, heat transfer printing, hot embossing, or inkjet printing. Furthermore, The second example of the method includes applying an ink on an end of a lower face of the second indium tin oxide film 302 to form a fourth ink layer 23. The fourth ink layer 23 has a thickness of 5-7 μm. The fourth ink layer 23 extends annularly to form a recessed space on the lower face of the second indium tin oxide film 302. The height of the recessed space on the lower face of the second indium tin oxide film 302 is the thickness of the fourth ink layer 23. The thickness of the fourth ink layer 23 is preferably 5 μm to make the display device thinner.

The second example of the method further includes coupling the second indium tin oxide film 302 to the first indium tin oxide film 301 by the module bonding layer 303. The module bonding layer 303 fills the recessed space on the lower face of the second indium tin oxide film 302 and the recessed space on the upper face of the first indium tin oxide film 301. The height of each recessed space is smaller such that the thickness of the module bonding layer 303 is reduced accordingly. The thickness of the module bonding layer 303 is smaller than or equal to 50 μm. The upper face of the second indium tin oxide film 302 is bonded to the cover 10 by the bonding layer 40. The bonding layer 40 fills the recessed space on the rear face 101 of the cover 10 and the recessed space on the upper face of the second indium tin oxide film 302. Thus, the thickness of the bonding layer 40 is reduced accordingly. The thickness of the bonding layer 40 is smaller than or equal to 50 μm.

The bonding layer 40 and the module bonding layer 303 use optically clear adhesive layers. In this example, the cover 10 is a touch control cover or a touch control glass. Furthermore, a fifth ink layer 24 is disposed on a lower face of the first indium tin oxide film 301 and has a thickness of 5-7 μm. The fifth ink layer 24 is disposed on an end of the lower face of the first indium tin oxide film 301. The method for producing a display device according to the present invention changes the thicknesses of the ink layers. After reducing the thicknesses of the ink layers, the current techniques can be used without the need of special machines or modification to the current techniques.

The advantageous effects of the method for producing a display device according to the present invention are that by disposing an ink layer on each structural layer, the single ink layer can be as thin as 5 μm, significantly reducing the level difference created by the ink layer and hence reducing the possibility of generation of bubbles during bonding. Thus, the bonding layer 40 can have a smaller thickness. In actual production, a bonding layer 40 with a thickness of only 50 μm is sufficient to achieve the bonding purposes without generation of bubbles. The thickness of the bonding layer 40 can effectively be reduced by providing the first ink layer 20 and the second ink layer 21 such that the overall thickness of the display device is reduced. Thus, the demand of lighting and thinning of electronic products is fulfilled by solving the problem of thick optically clear adhesive in the prior art.

Although specific embodiments have been illustrated and described, numerous modifications and variations are still possible without departing from the scope of the invention. The scope of the invention is limited by the accompanying claims.

The invention claimed is:

1. A display device comprising a display module, a cover, and a bonding layer disposed between the display module and the cover, wherein:
   the bonding layer has an upper surface and a lower surface which is parallel with the upper surface, and a first ink layer and a second ink layer are disposed respectively in at least a portion between the cover and the bonding layer and in at least a portion between the display module and the bonding layer.

2. The display device as claimed in claim 1, wherein a thickness of the first ink layer is 5-7 μm.

3. The display device as claimed in claim 1, wherein the display module further includes a first indium tin oxide film, a second indium tin oxide film, and a module bonding layer disposed between the first indium tin oxide film and the second indium tin oxide film, and a third ink layer is disposed in at least a portion between the first indium tin oxide film and the module bonding layer, wherein a thickness of the third ink layer is 5-7 μm.

4. The display device as claimed in claim 3, further comprising a fourth ink layer disposed in at least a portion between the second indium tin oxide film and the module bonding layer, and a thickness of the fourth ink layer is 5-7 μm.

5. The display device as claimed in claim 1, wherein a thickness of the second ink layer is 5-7 μm.

6. The display device as claimed in claim 1, wherein a thickness of the bonding layer is smaller than or equal to 50 μm.

7. The display device as claimed in claim 1, wherein the first ink layer is disposed toward an end of the cover.

8. A method for producing a display device, the display device at least comprises a display module and a cover, the method comprising:
   forming a first ink layer on an end portion of the cover;
   forming a bonding layer on the first ink layer and the cover; and
   configuring the display module on the bonding layer, such that the display module is coupled to the cover via the bonding layer and the first ink layer is coupled therebetween,
   wherein the bonding layer has a thickness smaller than or equal to 50 μm.

9. The method as claimed in claim 8, wherein the first ink layer has a thickness of 5-7 μm.

10. The method as claimed in claim 8, wherein the display module is made by the steps including:
    providing a first indium tin oxide film, and applying an ink on an end of an upper face of the first indium tin oxide film to form a third ink layer;
    forming a module bonding layer on the upper face of the first indium tin oxide film and the third ink layer;
    providing a second indium tin oxide film, applying an ink on an end of an upper face of the second indium tin oxide film to form a second ink layer, and applying an ink on an end of a lower face of the second indium tin oxide film to form a fourth ink layer; and
    coupling the lower face of the second indium tin oxide film to the upper face of the first indium tin oxide film by the module bonding layer.

11. The method as claimed in claim 10, wherein the second ink layer has a thickness of 5-7 μm.

\* \* \* \* \*